United States Patent [19]

Matsubara et al.

[11] Patent Number: 5,736,647
[45] Date of Patent: Apr. 7, 1998

[54] VORTEX FLOW METER DETECTOR AND VORTEX FLOW METER

[75] Inventors: Naoki Matsubara, Saitama; Jun Tanimoto, Kanagawa; Kenichi Takai, Tokyo; Shinsuke Imai, Kanagawa, all of Japan

[73] Assignee: Oval Corporation, Tokyo, Japan

[21] Appl. No.: 690,523

[22] Filed: Jul. 31, 1996

[30] Foreign Application Priority Data

Aug. 7, 1995 [JP] Japan .................... 7-200619
Nov. 1, 1995 [JP] Japan .................... 7-284802

[51] Int. Cl.$^6$ .................................................. G01F 1/32
[52] U.S. Cl. ........................................................ 73/861.22
[58] Field of Search ............................ 73/861.22, 861.24

[56] References Cited

U.S. PATENT DOCUMENTS

| | | | |
|---|---|---|---|
| 4,625,564 | 12/1986 | Murakami et al. | 73/861.24 |
| 4,627,295 | 12/1986 | Matsubara et al. | 73/861.24 |
| 4,706,503 | 11/1987 | Kamentser | 73/861.24 |
| 4,854,177 | 8/1989 | Phipps et al. | 73/861.24 |

FOREIGN PATENT DOCUMENTS

| | | |
|---|---|---|
| 0110321 | 6/1984 | European Pat. Off. . |
| 0144937 | 6/1996 | European Pat. Off. . |

*Primary Examiner*—Elizabeth L. Dougherty
*Assistant Examiner*—Jewel Artis
*Attorney, Agent, or Firm*—Jordan and Hamburg

[57] ABSTRACT

A vortex flowmeter detector is attached to or detachable from a vortex generation body for measurement of flow rate. The vortex flowmeter detector comprises a cylindrical oscillation tube having a bottom and a vortex detection part which is fixed by a fixing flange of the oscillation tube, wherein the oscillation tube is detachably inserted into a hole which is open to the vortex generation body at one end thereof, and the oscillation tube is fixed by a flange. An alternate pressure caused by a Karman vortex is introduced from both sides of the vortex generation body into the hole so as to oscillate the oscillation tube. This oscillation is received by a spring plate by way of an element cover, and it is transmitted to piezoelectric elements which are stuck to two chamfers of an elastic base material.

6 Claims, 7 Drawing Sheets

VORTEX FLOW METER DETECTOR AND VORTEX FLOW METER

BACKGROUND OF THE INVENTION

The present invention relates to a vortex flowmeter detector and a vortex flowmeter, more particularly relates to a vortex flowmeter detector which is detachably cantilevered at one end in a vortex generation body, and outputs a vortex signal in response to an alternate pressure caused by Karman vortex and a vortex flowmeter provided with the vortex flowmeter detector.

A vortex flowmeter is an inferential flowmeter which operates based on a principle that the number of Karman vortex generated per unit time by the vortex generation body supported in a flow tube is proportional to flow velocity in a given Reynolds number, wherein the inferential flowmeter has a vortex flowmeter detector for detecting the Karman vortex generated by the vortex generation body. There are two types of vortex flowmeter, one is an integration type having a vortex flowmeter detector integrally incorporated into the vortex generation body, and the other is a separate type having a vortex flowmeter detector disposed in a position where the vortex generation body is disposed. The integration type flowmeter is advantageous in that it can be small sized.

In the prior art vortex flowmeter detector, both ends of the vortex generation body are engaged by means of heat shrinkage fit in a cylindrical flow tube through which fluid to be measured passes, wherein pressure introduction ports are bored at both sides of the vortex generation body. The pressure introduction ports communicate with a recessed measuring chamber which is bored in the axial direction from one end of the vortex generation body together with the flow tube. There is formed a fixing surface at the outer wall of the flow tube, and the fixing surface has a surface which is perpendicular to an axis of the measuring chamber, wherein an oscillation tube having a fixing flange is cantilevered watertightly in the flow tube.

The oscillation tube comprises a cylindrical body having a bottom and a pressure receiving plate which extends coaxially outward from the bottom of the cylindrical body, wherein the pressure receiving plate faces the pressure introduction ports. An elastic plate-shaped base material which is flush with the pressure receiving plate is inserted into the cylindrical body in an axial direction, and piezoelectric elements are stuck to both sides of the elastic base material, whereby the elastic base material is integrally fixed to the cylindrical body with high insulating filler such as glass.

If a vortex generation body is fixed in a fluid flow, a Karman vortex is generated downstream relative to the vortex generation body and an alternate pressure is generated at both sides of the vortex generation body. The alternate pressure is introduced into the measuring chamber through the pressure introduction ports provided in the vortex generation body at the upper and lower direction of the vortex generation body so as to displace the pressure receiving plate to the right and left. This alternate displacement is transmitted to the piezoelectric elements stuck to the cantilevered oscillation tube so that a vortex signal is outputted from terminals in response to the alternate pressure in proportion to the flow rate.

Although a vortex generation body, which is determined according to the bore diameter of the vortex flowmeter, is fixed to the vortex flowmeter, an oscillation tube having the common or same size employed by the vortex flowmeter even if the sizes of the vortex generation bodies are differentiated. Further, since the vortex flowmeter detector having the same shaped oscillation tube which is cantilevered by and inserted into the measuring chamber of the vortex generation body is employed, there is an advantage that the production is rationalized, thereby providing the vortex flowmeter with low cost.

As mentioned above, the vortex flowmeter has a simple structure comprising the cylindrical flow tube, the vortex generation body fixed inside the cylindrical flow tube and the vortex flowmeter detector mounted inside the vortex generation body, and it is an inferential flowmeter capable of measuring the flow rate to an extent predetermined by the Reynolds number irrespective of the kind of fluid, i.e., gas or liquid. However, the shape of the vortex generation body and a relation between the vortex generation body and the inner diameter of the cylindrical flow tube are important in order to measure the flow rate with high accuracy within a wide range of the wide Reynolds number, and many proposals have been provided so far on this matter.

Among vortex flowmeters satisfying the above condition, there is one having the vortex generation body which is formed of an isosceles triangle in a cross section, wherein the upstream side thereof forms a base, and a ratio (d/D) of a width d of the vortex generation body facing the flow of fluid with respect to the inner diameter D of the cylindrical flow tube is set to be a value close to 0.28, and the ratio of inner diameter D with respect to the height of the isosceles triangle is set to be 1.5 to 3.5.

In the vortex flowmeter having such ratio (d/D) between the width d of the vortex generation body and the inner diameter D of the flow tube, is determined to be 0.28, the vortex generation body is fixed to the cylindrical flow tube while penetrating the flow tube in a direction of the diameter of the flow tube. Accordingly, the flow tube has holes defined in a direction of the diameter thereof, and the vortex generation body to be fitted into these holes has columnar portions, and they are sealed by the O rings engaged in the holes. The vortex generation body has a given isosceles triangle in its cross section in the passage wherein it has a base at an upstream side and is circular at the outer end surfaces, namely, it has different shapes in a cross section. The vortex generation body is retained by the flow tube with the bolt at a collar at one end and a presser ring at the other end. Accordingly, when the vortex generation body is viewed from the upstream side of the passage, the vortex generation body in the passage comprises a rectangular area portion formed by a base of a triangular prism, an arced area portion formed by a part of a wall surface of the passage and a short side of the rectangular portion.

Whereupon, although the vortex flowmeter is employed for measuring fluid having a wide range of temperature, ranging from a cryogenic LNG (liquefied natural gas) to a high temperature steam, etc., the first mentioned prior art vortex flowmeter detector uses glass as the filler, thereby generating the following problems:

(1) There occurs a problem of a corrosion resistance of the oscillation tube since glass is treated at high temperature and filled in the oscillation tube, thereby deteriorates strength of oscillation tube.

(2) It takes time for removing internal strain which is generated when glass is sealed, and to prevent air babble from entering and mixing with glass, and hence the oscillation tube is difficult to be manufactured.

(3) There is a likelihood that a crack is generated in the oscillation tube or the oscillation tube is broken because of a fatigue caused by concentrated stress which occurs locally or thermal fatigue since a material of oscillation tube and coefficient of thermal expansion of glass before the internal strain of glass is removed is largely different from those after the internal strain of glass is removed.

(4) Since the flowmeter detector is directly exposed to fluid, especially when high temperature fluid, moisture enclosed in glass gradually reaches the piezoelectric elements so that insulating resistance is reduced and high temperature limit to be used is restricted.

(5) It takes time to dry vortex flowmeter detector, and also it is difficult to remove the moisture sufficiently even if the vortex flowmeter is dried.

(6) Although the parallel lead wires as lead wires which are covered with insulating material are employed, and they are inserted into a metallic pipe. However, when an output impedance of oscillation detection elements is high, a noise becomes large and a signal to noise ratio is deteriorated owing to the change of capacitance caused by oscillation.

The vortex generation body of the second prior art vortex flow meter is columnar at both ends and the part facing flow of fluid has a plurality stage of shapes comprising the isosceles triangle, and the flow tube must be bored so as to insert the vortex generation body therein depending on the shape of the vortex generation body, which involves high cost in manufacturing the vortex generation body. As a result, even if the vortex generation body is simple in a structure, there is a disadvantage that it costs high.

SUMMARY OF THE INVENTION

It is an object of the present invention to provide a vortex flowmeter detector which can be commonly used in a vortex flowmeter having various bores, and can measure flow rate of a wide range of fluid under various temperature conditions with stability and high accuracy.

It is another object of the present invention to provide the flowmeter which is integrally formed by a flow tube and a vortex generation body with a precision casting, thereby reducing the cost of the flowmeter and enhancing instrument error characteristics.

PREFERRED EMBODIMENT OF THE INVENTION

Figure 1A:
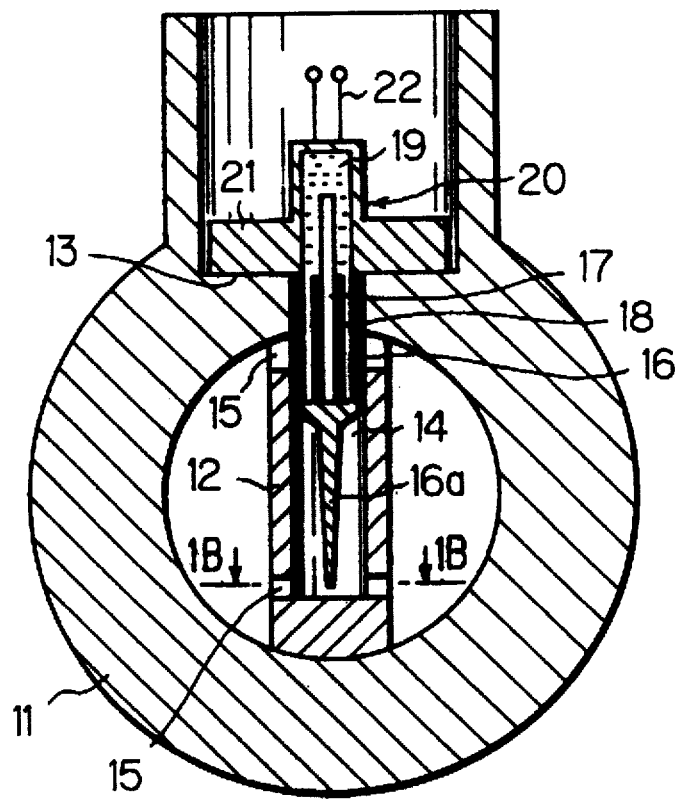
FIG. 1(A) and FIG. 1(B) are cross sectional views respectively explaining the first example of a prior art vortex flowmeter detector and vortex generation body.
Figure 1B:
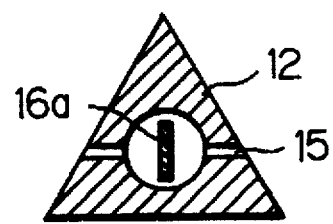

FIG. 1(A) is a cross sectional view for explaining a prior art vortex flowmeter detector, and FIG. 1(B) is a cross-sectional view of a vortex generation body (taken along the arrows 1B—1B in FIG. 1 (A)). In the vortex flowmeter, both ends of a vortex generation body 12 are engaged by means of heat shrinkage fit in a cylindrical flow tube 11 so as to be fixed to the cylindrical flow tube 11, through which fluid to be measured flows. Pressure introduction ports 15 are bored in both sides of the vortex generation body 12. The pressure introduction ports 15 communicate with a recessed measuring chamber 14 which is bored from one end of the vortex generation body 12 together with the cylindrical flow tube 11 and extends axially in the vortex generation body 12. A fixed surface 13 is formed on the outer wall of the cylindrical flow tube 11 and is positioned perpendicularly to the axis of the measuring chamber 14. An oscillation tube 20 having a fixed flange 21 is cantilevered by the fixed surface 13 so as to be watertightly brought into contact with the cylindrical flow tube 11.

The oscillation tube 20 comprises a cylindrical body 16 having a bottom, and a pressure receiving plate 16a arranged coaxially with the cylindrical body 16 and extending outward from the bottom of the cylindrical body 16, wherein the pressure receiving plate 16a faces the pressure introduction ports 15.

A plate-shaped elastic base material 17 is inserted into the cylindrical body 16 in the axial direction of the cylindrical body 16 and flush with the pressure receiving plate 16a. Piezoelectric elements 18 are stuck to both surfaces of the elastic base material 17 whereby the piezoelectric elements 18 are integrally fixed to the cylindrical body 16 by a filler or a sealing agent 19, which has high insulation property and is made of glass, etc.

When a fluid to be measured flows in the cylindrical flow tube 11 in a direction perpendicular to the plan surface in FIG. 1(A), a Karman vortex is generated downstream relative to the vortex generation body 12 and an alternate pressure is generated at both sides of the vortex generation body 12. The alternate pressure is introduced into the measuring chamber 14 through the pressure introduction ports 15 which are provided at upper and lower portions of the vortex generation body 12 in FIG. 1(A) so as to displace the pressure receiving plate 16a alternately right and left. The alternate displacement is transmitted to the piezoelectric elements 18 which are stuck inside the cantilevered oscillation tube 20, so that a vortex signal, which is responsive to the alternate pressure caused by the Karman vortex and is proportional to the flow rate, is outputted from terminals 22.

Although a vortex generation body, a size of which is determined depending on a bore of a vortex flowmeter, is fixed to the vortex flowmeter, the oscillation tube 20 having the same size is employed by the vortex generation bodies having various sizes. Further, since there is employed a vortex flowmeter detector provided with an oscillation tube having the same shape which is cantilevered and inserted into the measuring chamber 14 of the vortex generation body 12, there is an effect that the production is rationalized, thereby providing the vortex flowmeter with low cost.

As mentioned above, the vortex flowmeter has a simple structure comprising the cylindrical flow tube 11, the vortex generation body 12 fixed inside the cylindrical flow tube 11 and the oscillation tube 20 mounted inside the vortex generation body 12, and it is an inferential flowmeter capable of measuring the flow rate to an extent predetermined by the Reynolds number irrespective of the kind of fluid, i.e., gas or liquid. However, the shape of the vortex generation body 12 and a relation between the vortex generation body 12 and the inner diameter of the cylindrical flow tube 11 are important in order to measure the flow rate with high accuracy within a wide range of the Reynolds number, and many proposals have been provided so far on this matter.

Among vortex flowmeters satisfying the above condition, there is one having the vortex generation body 12 which is formed of an isosceles triangle in a cross section, wherein the upstream side thereof forms a base, and a ratio (d/D) between a width d of the vortex generation body 12 facing the flow of fluid and an inner diameter D of the cylindrical flow tube 11 is set to be about 0.28, and the ratio between the inner diameter D and a height of the isosceles is set to be 1.5 to 3.5.

Figure 2A:
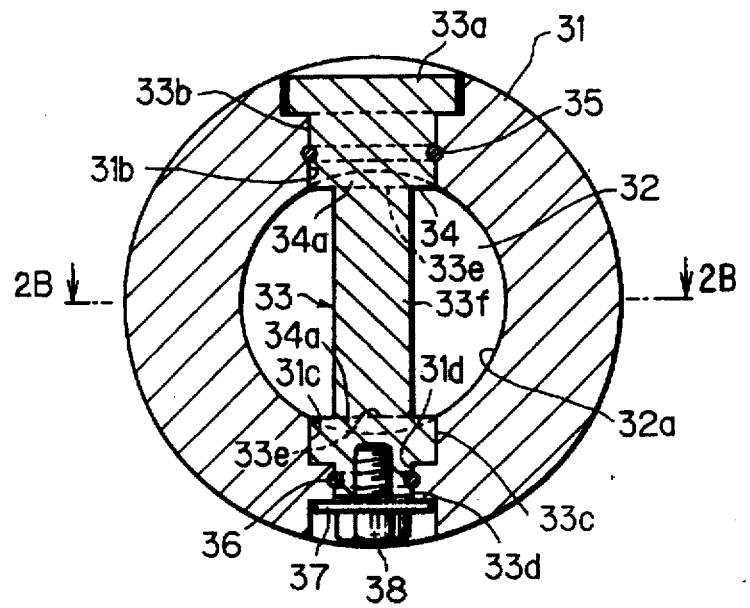
FIG. 2(A) and FIG. 2(B) are cross sectional views respectively explaining the second example of a prior art vortex flowmeter.
Figure 2B:
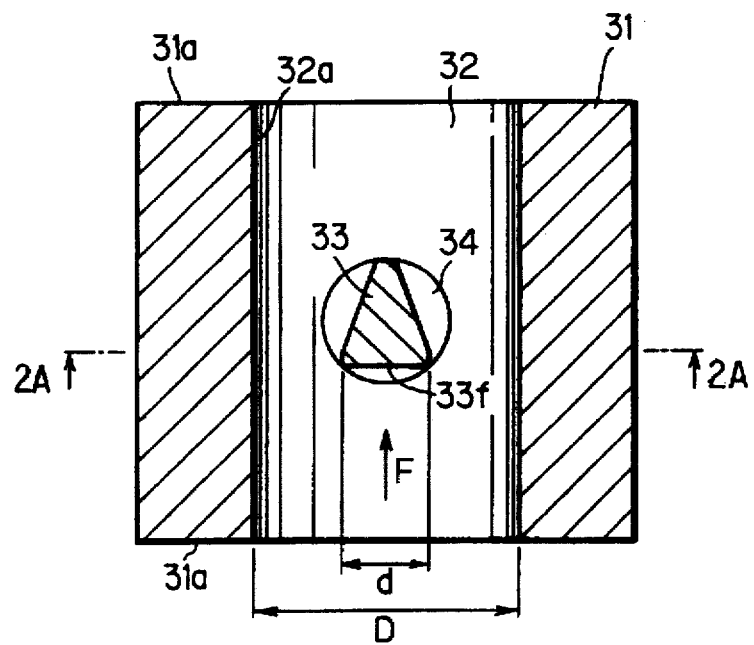

A prior art vortex flowmeter body satisfying such condition is illustrated in FIGS. 2(A) and 2(B). FIG. 2(A) and FIG. 2(B) are cross-sectional views respectively explaining a second example of the prior art vortex flowmeter, wherein FIG. 2(A) is a cross-sectional view taken along the arrows 2A—2A in FIG. 2(B) and FIG. 2(B) is a cross-sectional view taken along the arrows 2B—2B in FIG. 2(A). Denoted by 31 is a flow tube, 32 is a passage, 33 is a vortex generation body, 34 are outer end surfaces, 35 and 36 are O-rings 37 is presser ring, 38 is a bolt, and an arrow F is a flowing direction of a fluid.

The ratio (d/D) between the width d of the vortex generation body 33 and the inner diameter D of the flow tube 31 is fixed to be 0.28 in the prior art vortex flowmeter shown in FIG. 2(A) and FIG. 2(B). The vortex generation body 33 is fixed to the cylindrical flow tube 31 while penetrating the flow tube 31 in a direction of the diameter of the flow tube 31. Accordingly, the flow tube 31 has end surfaces 31a which are parallel with each other and the circular passage 32 has the diameter D. The flow tube 31 further has holes 31b, 31c and 31d which extend radially. The vortex generation body 33 to be fitted into these holes 31b, 31c and 31d at both ends has columnar portions 33b, 33c and 33d which are sealed by the O rings 35 and 36 engaged in the holes 31b, 31c and 31d. The vortex generation body 33 has a given isosceles triangle cross section in the passage 32 wherein it has a base at an upstream side and a plurality stage of shapes at the outer end surfaces 34 in a cross section. The vortex generation body 33 is retained by the flow tube 31 with a collar 33a at one end and a presser ring 37 at the other end by way of the body 38. Accordingly, in the case of FIG. 2(A) when the vortex generation body 33 is viewed from the upstream side of the passage 32, the vortex generation body 33 in the passage 32 comprises a rectangular area portion 33f formed by a base of a triangular prism, and an arced area portion 34a formed by an arc portion formed at part of a wall surface 32a of the passage 32 at both ends of the rectangular portion and a short side 33e of the rectangular portion.

The vortex flowmeter is employed for measuring fluid having a wide range of temperature, namely, fluid ranging from a cryogenic LNG (liquefied natural gas) to a high temperature steam, etc. However, the prior art vortex flowmeter detector shown in FIG. 1(A) uses glass as a filler or a sealing agent in the oscillation tube 20. As a result, there occurred the problems set forth in (1) through (6).

The vortex generation body 33 of the prior art vortex flowmeter as shown in FIG. 2(A) is columnar at both ends and has a plurality of stages of shapes comprising an isosceles triangle at a portion facing flow of fluid. The flow tube 31 must be bored for fitting the vortex generation body 33 corresponding to the shape of the vortex generation body 33, which increases costs. As a result, there is a disadvantages that the prior art vortex flowmeter is high in cost even if it has a simple structure.

Figure 3A:
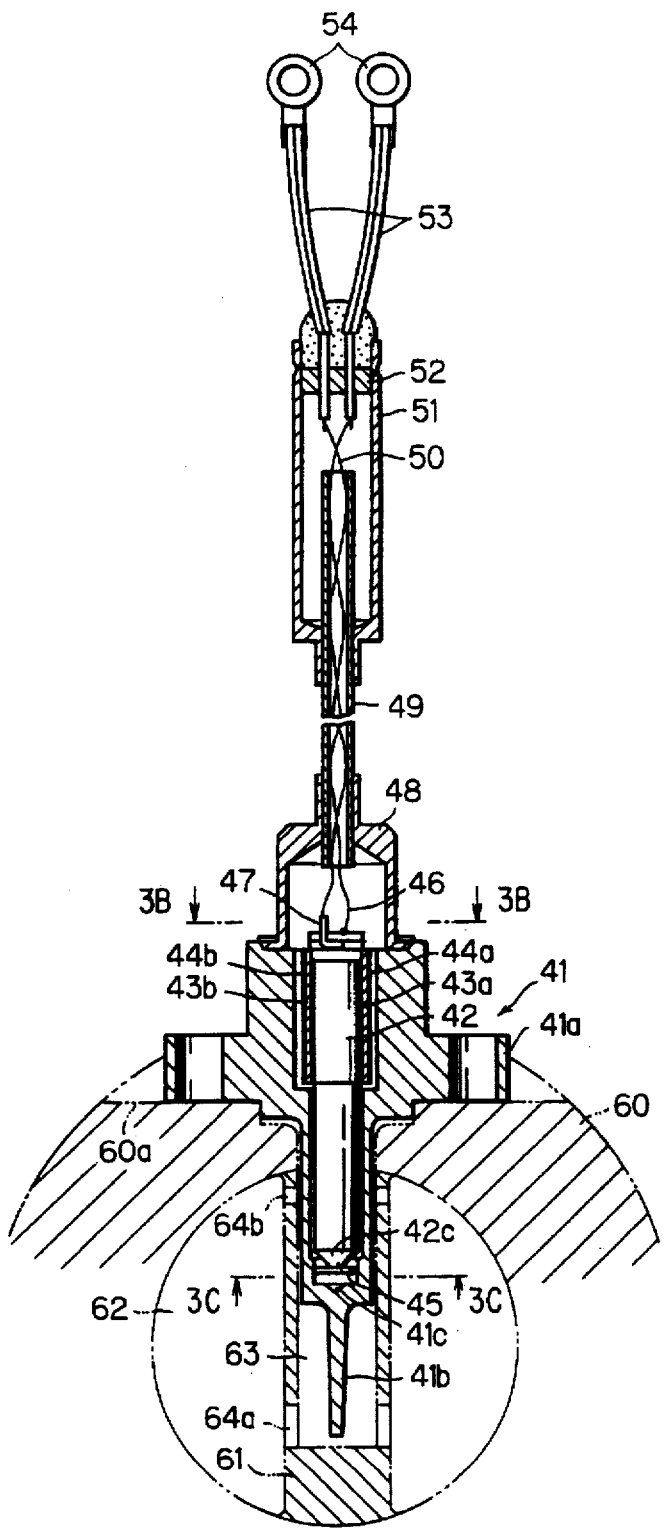
FIG. 3(A) through FIG. 3(C) are cross sectional views showing main parts of a vortex flowmeter detector according to the first embodiment of the present invention.
Figure 3B:
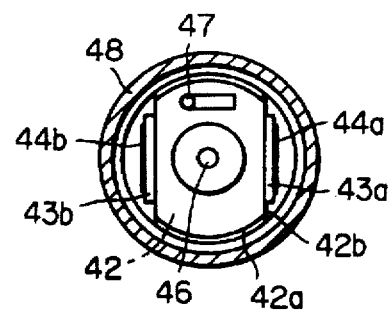
Figure 3C:
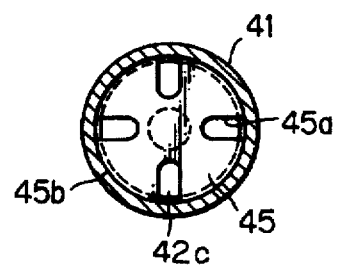

FIGS. 3(A) through FIG. 3(C) are cross sectional views showing a vortex flowmeter detector according to a first embodiment of the present invention, wherein FIG. 3(A) shows an entire structure, FIG. 3(B) is an enlarged cross-sectional view taken along the arrows 3B—3B in FIG. 3(A) and FIG. 3(C) is an enlarged cross-sectional view taken along the arrows 3C—3C FIG. 3 (A). Denoted by 41 is an oscillation tube, 42 is an elastic base material, 43a and 43b are respectively piezoelectric elements (oscillation detection elements), 44a and 44b are respectively electrode plates, 45 is a spring plate, 46 and 47 are respectively output terminals, 48 is a cap, 49 is a sheath pipe, 50 are lead wires respectively, 51 is a terminal block, 52 is a hermetic terminal, 53 are external lead wires, 54 are respectively terminals, 60 is a vortex flowmeter body (flow tube), 61 is a vortex generation body, 62 is a passage, 63 is a measuring chamber, 64a and 64b are respectively pressure introduction ports.

The vortex flowmeter detector shown in FIG. 3(A) is a vortex detector to be mounted on a vortex flowmeter body comprising the cylindrical flow tube 60 and the vortex generation body 61 which is supported in the flow tube 60 at both ends thereof. A recessed measuring chamber 63 is bored in the vortex generation body 61 to extend axially from one end thereof, and the pressure introduction ports 64a and 64b, which are respectively open to both sides of the vortex generation body 61, communicate with the measuring chamber 63. A hole, which penetrates coaxially with the measuring chamber 63, is bored in the flow tube 60, and it has a detector fixing surface 60a which is positioned perpendicular to the axis of the measuring chamber 63.

The oscillation tube 41 is a cylindrical body having one end which is open and another end which has a bottom portion 41c, and further comprises a flange 41a at the outer periphery of the open one end thereof. The oscillation tube 41, is inserted into the measuring chamber 83 and is cantilevered by and fixed to the detector fixing 60a by the flange 41a. A pressure receiving plate 41b is provided at the outside of the bottom portion 41c of the oscillation tube 41 which is inserted into the measuring chamber 63, wherein an alternate pressure caused by the vortex, which is introduced from the pressure introduction port 64a of the vortex generation body 61 to the measuring chamber 63, can be received by the pressure receiving plate 41b.

The elastic base material 42 has a metallic pillar-shaped body and is inserted into the oscillation tube 41, wherein one end of the elastic base material 42 is pressed into and fixed to the oscillation tube 41, and the other end thereof is supported by the plate 45, described later. As a result, the elastic base material 42 receives variable differential pressure caused by the Karman vortex acting upon the oscillation tube 41, and transmits the displacement of the oscillation tube 41 which is alternately displaced to the oscillation detector elements with high fidelity. The elastic base material 42 has an upper pressure fitted portion 42a at a part of the open upper end of the oscillation tube 41, an end portion 42c at the bottom portion 41c of the oscillation tube 41, wherein the end portion 42c has a flat surface with a small diameter, for example, it is cut in a tapered shape toward the lower end surface and is flat at the end surface. An outer diameter of the middle part of the elastic base material 42 is slightly smaller than the inner diameter of the oscillation tube 41 and does not contact the oscillation tube 41.

Two chamfers 42b are formed at the upper pressure fitted portion 42a, the oscillation detector elements, for example, the piezoelectric elements 43a and 43b are stuck to each surface of the upper pressure fitted portions 42a as shown in FIG. 3(B). The piezoelectric elements 43a and 43b have a piezoelectric constant d33 and are polarized in the direction of a thickness thereof. The electrode plates 44a and 44b which are respectively formed of a porous plate are stuck to the non-sticking surface of the piezoelectric elements 43a and 43b, thereby forming a parallel-typed bimorph. The piezoelectric elements 43a and 43b have one output terminal 47 formed of the elastic base material 42 and another output terminal 46 formed of the electrode plates 44a and 44b which are connected to each other. Other strain detectors may be provided instead of the piezoelectric elements 43a and 43b.

The spring plate 45, having a perpendicular surface relative to the axis of the elastic base material 42, is fixed to the end portion 42c by a spot welding, etc. The plate 45 is discoidal and has an outer diameter which is slightly larger than the inner diameter of the oscillation tube 41 as shown in FIG. 3(C), and further includes a plurality of radially arranged notches 45a and a supporting piece 45b. The supporting piece 45b has a spring function in such a manner that the outer end portion thereof can be displaced relative to the end portion 42c in the axial direction of the elastic base material 42, wherein when the supporting piece 45b is pressed into the oscillation tube 41, it can be easily curved and inserted into the oscillation tube 41 in the inserting direction, thereby transmitting the oscillation displacement of the oscillation tube 41 to the elastic base material 42 with high fidelity.

The open upper end of the oscillation tube 41 is covered with the cap 48 which protects the oscillation detector elements and is insulating. The sheath pipe 49 penetrates the center of the cap 48 and is fixed to the cap 48, and the other end of the sheath pipe 49 penetrates and is fixed to the terminal block 51 having the hermetic terminal 52. Two lead wires 50 are inserted into the sheath pipe 49, and are connected between the output terminals 46 and 47 and the hermetic terminal 52. The external lead wires 53, and 53 having the terminals 54, and 54 are connected to the hermetic terminal 52. When dry gas such as nitrogen gas is sealed into the terminal block 51 before the hermetic terminal 52 is fixed to the terminal block 51, the gas inside the cap 48 is replaced by such dry gas which passes through the sheath pipe 49, and hence the piezoelectric elements 43a and 43b remain insulated even if they are placed under a high or low temperature condition.

The vortex flowmeter detector having the arrangement shown in FIG. 3(A) can transmit the displacement of oscillation tube to the elastic base material by way of the spring plate 45, having notches and fixed to the bottom end of the elastic base material 42, without using the filler or sealing agent such as glass whereas in the prior art the elastic base material in the oscillation tube is sealed by glass so as to transmit the displacement of oscillation tube to the elastic base material onto which the oscillation detector elements are stuck, so that the vortex flowmeter detector of the present invention can be easily assembled and can reduce the time involved in manufacturing thereof. However, since the oscillation tube 41 and the elastic base material 42 are fixed to each other and not separable from each other at the upper pressure portion 42a, there is a drawback that the operation of the vortex flowmeter must be stopped so as to prevent fluid from being spouted from the measuring chamber 63 of the vortex generation body 61 when the vortex flowmeter detector is inspected or replaced by another.

Figure 4A:
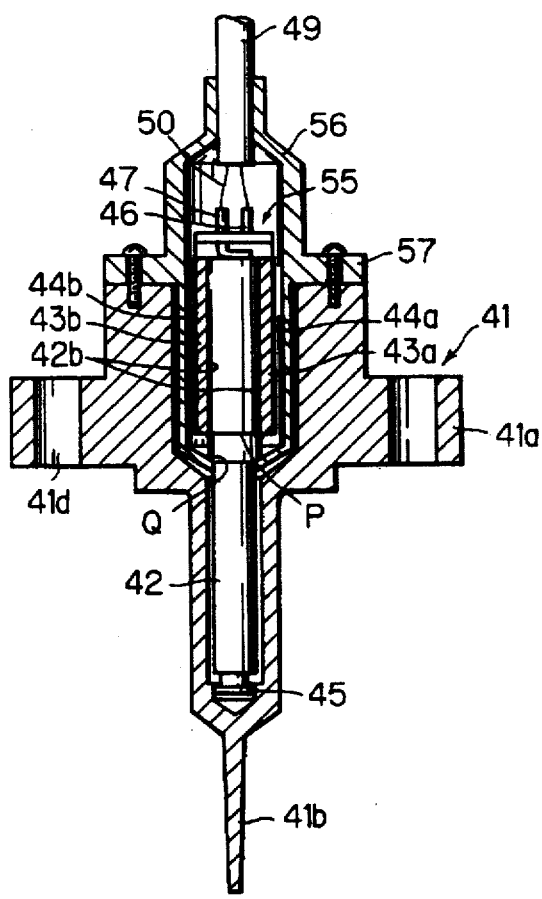
FIG. 4(A) through FIG. 4(C) are cross sectional views showing main parts of a vortex flowmeter detector according to the second embodiment of the present invention.
Figure 4B:
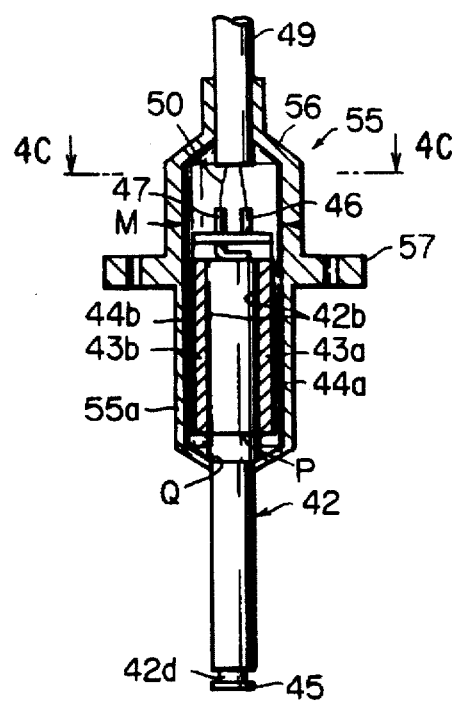
Figure 4C:
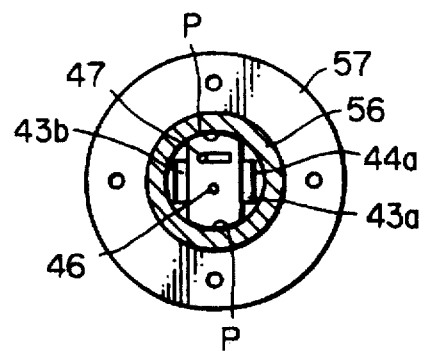

FIG. 4(A) through 4(C) are views for explaining a vortex flowmeter detector according to the second embodiment of the present invention, wherein FIG. 4(A) is a longitudinal cross-sectional view of the vortex flowmeter detector, FIG. 4(B) is a cross-sectional view of a vortex detection part, and FIG. 4(C) is a cross sectional view taken along the arrows 4C—4C in FIG. 4 (B). Denoted by 55 is a vortex detection part, 56 is an element cover, and 57 is a fixing flange to fix the element cover 56 to the oscillation tube 41. Elements which function the same as those in FIG. 3(A) through FIG. 3(C) are denoted by the same reference numerals.

The vortex flowmeter detector as shown in FIG. 4(A) through 4(C) has such a structure that the oscillation tube 41 and vortex detection part 55 are detachably separated from each other so as to take out the vortex detection part 55 alone without stopping the flow of fluid. That is, the oscillation tube 41 is fixed watertightly to the flow tube, and the vortex detection part 55 is detachable to the oscillation tube 41 by way of the element cover 56.

The vortex detection part 55 is sealed by the element cover 56 at areas P and Q where the piezoelectric elements 43a and 43b respectively stuck to the two chamfers 42b of the elastic base material 42 are put, and inactive gas is sealed into the vortex detection part 55. The fixing flange 57, which is fixed to the open end of the oscillation tube 41, is provided at the outer periphery of the element cover 56. The oscillation tube 41 is supported by the spring plate 45, which has the radially recessed notches 45a and is fixed to a tip end 42d of the elastic base material 42, and the fixing flange 57.

Since the element cover 56 and the elastic base material 42 are respectively supported by a circumferential part P of the two chamfers 42b and a lower part Q of the two chamfers 42b as shown in FIG. 4(C), the alternate pressure acting upon the oscillation tube 41 is transmitted to the piezoelectric elements 43a and 43b, which are respectively stuck to the elastic base material 42, by way of the spring plate 45 if a cylindrical part 55a, at the lower portion of the element cover 56, is made thin and reduced in its rigidity.

Due to the provision of the vortex detection part 55 having the element cover 56, the vortex detection part 55 is detachable without removing the oscillation tube 41 from the flow tube so that the vortex detection part 55 alone can be inspected without stopping the operation of a plant, and it can be removed and can be replaced by another.

Although the oscillation tube 41 and the elastic base material 42 are respectively made of metal, if they are different from each other in coefficient of thermal expansion, there is a possibility that heat indication is generated in the oscillation tube 41 and a crack is generated in the oscillation tube 41 due to thermal fatigue so that the oscillation table is damaged when the oscillation tube 41 is used for a long time. When the coefficient of thermal expansion of the oscillation tube 41 is made the same as that of the elastic base material 42, the aforementioned possibility is prevented and the range of temperature is increased, thereby increasing the range of the use of the vortex flowmeter.

According to the vortex flowmeter detector of the second embodiment, since the oscillation tube 41 and the elastic base material 42 are formed separately and can be detached and attached without the filler or the sealing agent such as glass, and the elastic base material 42 alone can be replaced by another, the vortex flowmeter detector provides high reliability with low cost. The flow tube comprising the oscillation tube 41 and the elastic base material 42 which are integrated with each other can be provided simply with low cost with respect to such vortex flow meter detector.

Figure 5A:
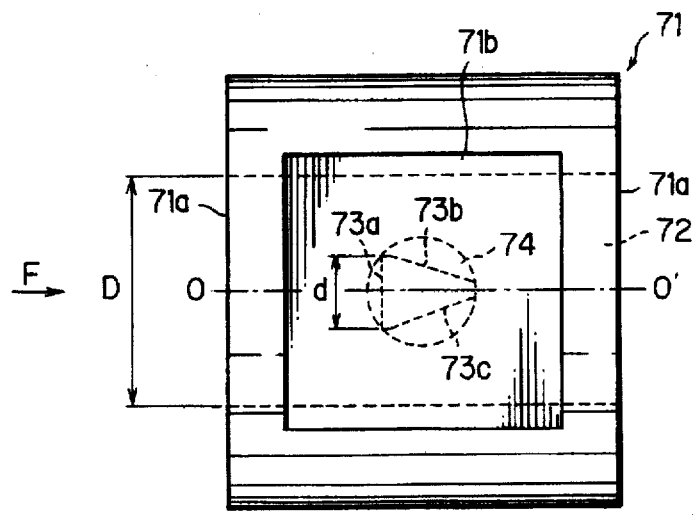
FIG. 5(A) through FIG. 5(C) are cross sectional views respectively explaining a vortex flowmeter provided with the vortex flowmeter detector according to the first embodiment of the present invention.
Figure 5B:
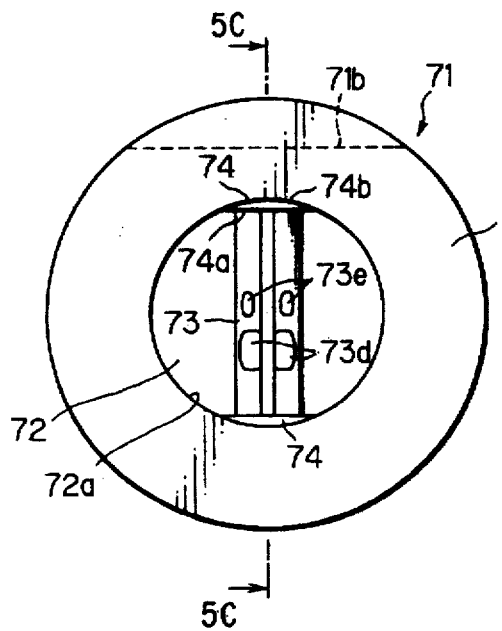
Figure 5C:
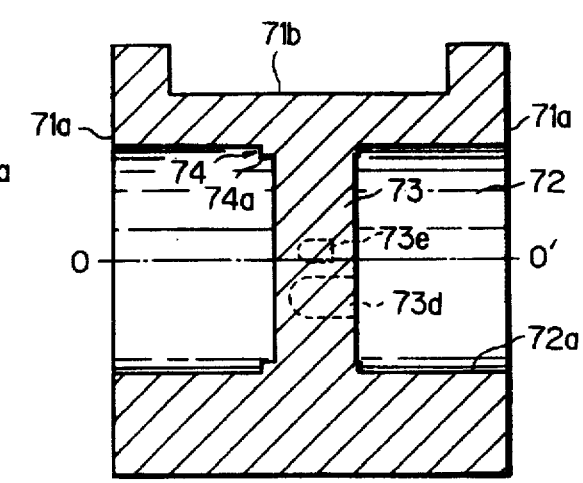

FIG. 5(A) through FIG. 5(C) are views for explaining a vortex flowmeter according to the first embodiment of the present invention, wherein the vortex flowmeter is provided with the vortex flowmeter detector. FIG. 5(A) is a plan view, FIG. 5(B) is a front view as viewed from the downstream side in FIG. 5(B), and FIG. 5(C) is a cross-sectional view taken along the arrows 5C—5C in FIG. 5(B). Denoted by 71 is a flow tube, 72 is a passage, 73 is a vortex generation body, and 74 is an arc protrusion.

In FIG. 5(A), the flow tube 71 is an example of a so-called flangeless flow tube comprising a cylindrical body having the passage 72 with inner diameter of which is D and which is extended coaxially with the axis O–O' thereof. The flow tube 71 is coaxially held on a flow tube (not shown) through which fluid to be measured passes between flanges of such flow tube and is held by bolts, etc. The flow tube 71 includes end surfaces 71a on both ends which are parallel with the flange surface of the flow tube, and a vortex generation body 73 having a shape of a triangular prism for dividing the passage 72 at right angles with the axis O–O'. The vortex generation body 73 has a given pillar-shaped body in its cross section, and is formed of an isosceles triangle in a cross-section comprising a base 73a, which faces flow of fluid in the direction of F, and inclined sides 73b and 73c. The both ends of the vortex generation body 73 to be connected to a wall surface 72a of the passage 72 form the arc protrusion 74 which is surrounded by circular outer end surfaces 74a circumscribing the isosceles triangle in the direction at right angles to the axis of the vortex generation body 73 and arcs 74b of the passage 72. Further, there are provided in the vortex generation body pairs of pressure introduction ports 73d and 73e which respectively communicate with a measuring chamber wherein the measuring chamber is open at one end in the axial direction.

The dimensional ratio between the width d of the vortex generation body 73 and the diameter D of the cylindrical passage 72 and a preferable value of the vortex generation body 73 are set in such a manner that the dimensional ratio (d/D) is preferably set to be 0.2–0.4 with the inclination angle with respect to the axis O–O' of the inclined sides 73b and 73c of the isosceles triangle in a given angular range. The arc protrusion 74 is provided so that the vortex column caused by the Karman vortex flowing out from the vortex generation body 73 is peeled off substantially in parallel with the vortex generation body 73, thereby forming substantially a two dimensional Karman vortex, whereby the Re characteristics relative to the instrument error is remarkably improved.

The flow tube 71, the vortex generation body 73, and the arc protrusions 74 shown in FIG. 5(A) are integrally formed by precision casting, for example, by a lost-wax process (investment casting method). The lost-wax method comprises preparing a mold of the vortex flowmeter detector made of heat soluble material such as bees wax, covering the mold with refractory material such as silica sand, powdered lime, heating the heat soluble mold to thereby melt the mold, introducing casting metal such as a stainless steel into a hollow mold and solidifying the casting metal, and removing the refractory material. The surface of the vortex flowmeter is subject to a surface treatment by a sand blast, etc. so as to be become a smooth surface.

The vortex flowmeter, which was thus subject to the surface treatment, has a detector fixing surface 71b for fixing the vortex flowmeter detector to the outer wall thereof. Bores are defined in the measuring chamber which is provided in the vortex generation body 73 extending from the detector fixing surface 71b in the axial direction of the vortex generation body 73, wherein the bores of the measuring chamber communicate with the pressure introduction ports 73d, 73d, 73e and 73e, thereby forming the vortex flowmeter having a given characteristic of instrument error.

Figure 6A:
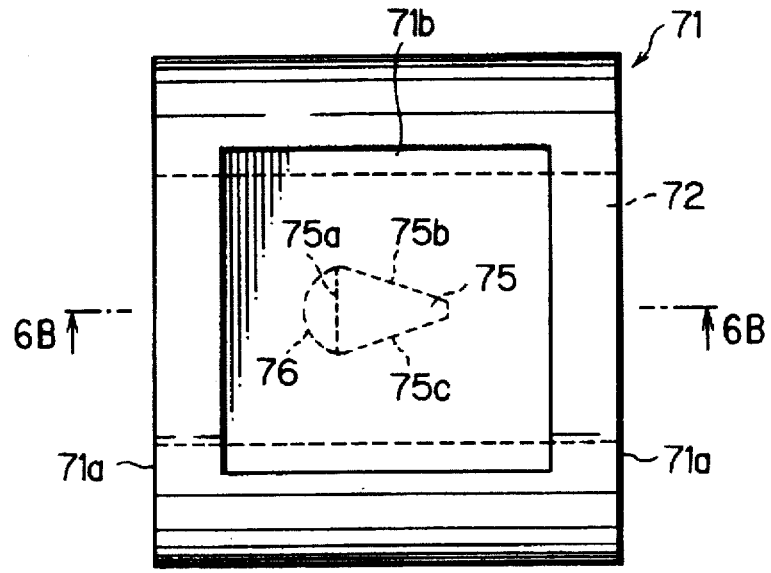
FIG. 6(A) and FIG. 6(B) are cross sectional views respectively explaining a vortex flowmeter provided with the vortex flowmeter detector according to the second embodiment of the present invention.
Figure 6B:
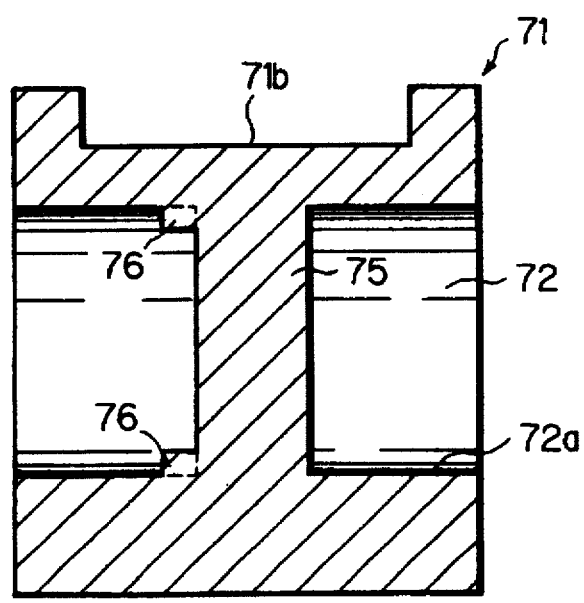

FIG. 6(A) and FIG. 6(B) are views for explaining a vortex flowmeter according to the second embodiment of the present invention, wherein the vortex flowmeter is provided with the vortex flowmeter detector. FIG. 6(A) is a plan view, and FIG. 6(B) is a cross-sectional view taken along the arrows 6B—6B in FIG. 6(A). Denoted by 75 is a vortex generation body and 76 are arc flat plate portions. Elements which function the same as those in FIG. 5(A) through FIG. 5(C) are denoted by the same reference numerals in FIG. 5(A) to FIG. 5(C).

The vortex generation body 75 of the vortex flowmeter as shown in FIG. 6(A) and FIG. 6(B) has an isosceles triangle having a base 75a at an upstream side and both sides 75b and 75c in the same manner as the vortex generation body 73 in a cross-section in FIG. 5(C), wherein the connecting portion between the vortex generation body 75 and the flow tube 71 is provided with the flat arc plate portions 76 instead of the arc protrusions 74. The flat arc plate portions 76 are flat plate portions which from the base 75a at a portion adjacent to the connecting portion of the vortex generation body 75 to the wall surface 72a at the upstream side of the passage 72 so as to protrude in an arc shape.

In the prior art vortex flowmeter, for example, the vortex flowmeter as shown in FIG. 2(A) and FIG. 2(B), a horseshoe vortex comprising vortex threads is generated from the upstream side of the portion adjacent to the wall surface of the passage and the vortex generation body 33 to the downstream side thereof and it is flown out. The horseshoe vortex is a vortex which is generated when dynamic pressure caused by the flow of fluid is high at the center of a surface 33f at the upstream side of the vortex generation body 33 is low at both sides of the vortex generation body 33, and also small at a passage wall surface 32a. The horseshoe vortex is generated at the boundary layer of the passage wall surface 32a at the portion adjacent to the vortex generation body 33. The horseshoe vortex generated at the boundary layer of the passage wall 32a is peeled off in parallel with the vortex threads extending from the sides of the vortex generation body 33, and is flown out. As a result, it disturbs the Karman vortex which is flown out from the vortex generation body 33, thereby deteriorating the instrument error/Reynolds number characteristics, so that it is easily influenced by the piping system. The arc flat plate portions 76 are provided for removing the horseshoe vortex.

Figure 7A:
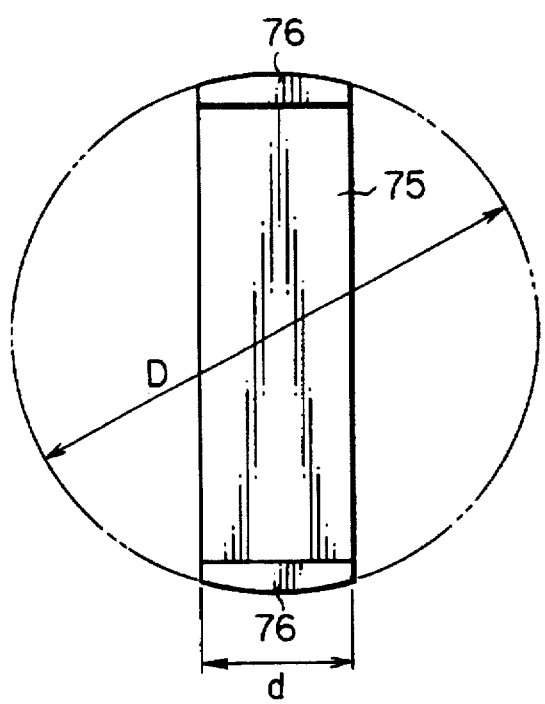
FIG. 7(A) through FIG. 7(C) are cross sectional views respectively explaining a vortex flowmeter provided with the vortex flowmeter detector according to the third embodiment of the present invention.
Figure 7B:
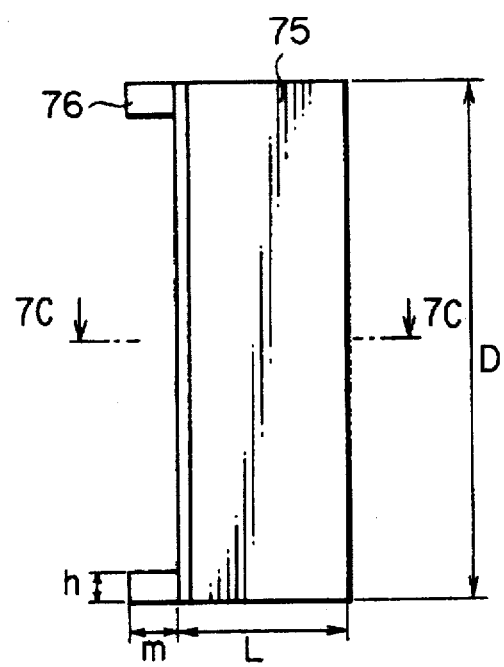
Figure 7C:
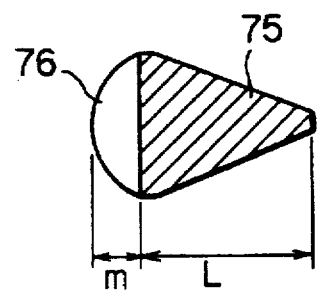

FIG. 7(A) through FIG. 7(C) are views for explaining a vortex flowmeter according to the third embodiment of the present invention, wherein the vortex flowmeter is provided with the vortex flowmeter detector. FIG. 7(A) is a plan view as viewed from the flowing direction, FIG. 7(B) is a side view, and FIG. 7(C) is a cross-sectional view taken along the arrows 7C—7C in FIG. 7(B). Elements which function the same as those in FIG. 8(A) and FIG. 8(B) are denoted by the same reference numerals.

A vortex generation body 75 shown in FIG. 7(A) through FIG. 7(C) has an isosceles triangular prism having a length which is the same as the inner diameter D (passage) of the flow tube 71 and a width d facing the flow of fluid, and a length L in the flowing direction, wherein these dimensions range as follows.

$$0.2 < d/D < 0.4 \quad (1)$$

$$1.5 < D/L < 3.5 \quad (2)$$

If the arc flat plate portions 76 are provided in the vortex flowmeter having the vortex generation body 75 having such dimensions, the instrument error/Reynolds number characteristics are improved, as mentioned above. In addition to that, an experiment carried out by the applicant of this invention revealed that the flow rate instrument error characteristics were improved if the dimension of the arc flat plate portions 76 set as follows.

$$0.03\ D < m < 0.07\ D \quad (3)$$

$$0.04\ D < h < 0.07\ D \quad (4)$$

That is, the instrument error is ±0.5% if the Reynolds number (Re number) is in the range of $2\times10^4$–$10^7$, and a relative instrument error with respect to a meter constant reveals that it exceeds −1% if the length of straight tube is 5 D but it is ±0.5% or less if the length of the straight tube is 10 D or more in the case that the test is performed under the condition that the length of the straight tube at the upstream side is 40 D when one 90° elbow and a double elbow are provided at the upstream side.

The present invention has the effect that the arc flat plate portions 76 remove the horseshoe vortex which is flown out from the vortex generation body 75, and generate the two dimensional Karman vortex, thereby reducing the influence by the piping system. The vortex flowmeter according to the third embodiment can be integrally formed by precision casting like the first embodiment, thereby providing the vortex flowmeter with high precision and low cost.

We claim:

1. A vortex flowmeter detector for detecting an alternating pressure produced by a Karman vortex in a vortex flow meter having a cylindrical flow tube through which a fluid flows, the cylindrical flow tube having a vortex generation body fixed within the cylindrical flow tube at right angles with respect to the flow of the fluid, said vortex generation body having a measuring chamber which is open at one end of the vortex generation body in an axial direction thereof, said vortex flowmeter detector comprising;

an oscillation tube having a closed bottom, said oscillation tube being inserted into said measuring chamber and supported watertightly at said open one end of said measuring chamber;

an elastic base material member supported at least at two points inside said oscillation tube in an axial direction thereof;

said elastic base material member having a spring plate fixed at a first end thereof and oriented perpendicular to said axial direction of said oscillation tube, said spring plate having radial notches in a periphery thereof, and said spring plate detachably engaging inside surfaces of said oscillation tube, proximate said closed bottom, under compression to provide one of said at least two points of support for said elastic base material member; and said elastic base material member having oscillation detector elements fixed thereto at another one of said two points of support, wherein oscillation caused by said alternating pressure acting upon said oscillation tube is detected by said oscillation detection elements.

2. A vortex flowmeter detector according to claim 1 further comprising a cylindrical element cover for sealing lead wires extending from said oscillation detector elements, said cylindrical cover detachably interconnecting said elastic base material member and said oscillation tube to provide said another one of said two points of support whereby said elastic base material member is detachably supported in said oscillation tube by way of said element cover.

3. A vortex flowmeter detector according to claim 1 or 2, wherein a material of said oscillation tube is substantially the same as that of said elastic base material member in terms of coefficient of thermal expansion.

4. A vortex flowmeter comprising said vortex flowmeter detector including said cylindrical flow tube and said vortex generation body according to any of claims 1 or 2, wherein:

said cylindrical flow tube has a cylindrical body, said vortex generation body has a center portion in the form of an isosceles triangular prism having a cross-section in the form of an isosceles triangle with a base at an upstream side of said vortex generation body, and end portions on opposing ends of said center portion attached to inner walls of said flow tube;

said end portions being circular and circumscribing ends of said isosceles triangular prism; and wherein said cylindrical flow tube and said vortex generation body are integrally formed with each other.

5. A vortex flowmeter comprising said vortex flowmeter detector including said cylindrical flow tube and said vortex generation body according to any of claims 1 or 2, wherein:

said cylindrical flow tube has a cylindrical body, said vortex generation body is in the form of an isosceles triangular prism having a cross section in the form of an isosceles triangle with a base at an upstream side of said vortex generation body, and opposing ends of isosceles triangular prism attached to inner walls of said flow tube;

said vortex generation body further comprising arc shaped flat plate portions provided at said opposing ends of said vortex generation body and fixed to said flow tube, said arc shaped flat plate portions each protruding from a base surface of said isosceles triangular prism in an upstream direction along said inner walls of said flow tube; and wherein said flow tube and said vortex generation body are integrally formed with each other.

6. A vortex flowmeter according to claim 5, wherein ranges of dimensions are as follows:

$$0.2 < d/D < 0.4$$

$$1.5 < D/L < 3.5$$

$$0.03D < m < 0.07D$$

$$0.04D < h < 0.07D$$

where D is an inner diameter of said flow tube, d is a width of said base of said isosceles triangular prism facing upstream, L is a length of said vortex generation body in a direction of said flow of fluid, and m is the maximum length of said arc shaped flat plate portions protruding perpendicularly from said base of said isosceles triangular prism, and h is a height of said arc shaped flat portions in an axial direction of said isosceles triangular prism.

* * * * *